Oct. 25, 1966  W. ECKHARDT  3,280,652

FLEXIBLE PUSH-AND-PULL TRANSMITTING CABLES

Filed Nov. 10, 1964

INVENTOR
Wilhelm Eckhardt
BY
Michael J. Striker
ATTORNEY

United States Patent Office 3,280,652
Patented Oct. 25, 1966

3,280,652
FLEXIBLE PUSH-AND-PULL TRANSMITTING CABLES
Wilhelm Eckhardt, Ehringshausen, Kreis Wetzlar, Germany, assignor to Kuster & Co. G.m.b.H., Ehringshausen, Kreis Wetzlar, Germany
Filed Nov. 10, 1964, Ser. No. 410,079
15 Claims. (Cl. 74—501)

The present invention concerns flexible push-and-pull transmitting cables. In such flexible cable arrangements it is known to use a flexible load transmitting elongated core member longitudinally movable in either direction within a surrounding flexible tubular sheath. Also it has already been proposed to mount inside such a tubular sheath a series of ball bearing type guides each comprising a kind of ball cage and a plurality of balls rotatably arranged in such a cage.

It has been found that the conventional types of flexible cable arrangements of the kind mentioned above are comparatively involved, requiring a comparatively great number of components and are therefore rather expensive and difficult to manufacture. Also, in practical use of such conventional types of flexible cables difficulties have developed which are mainly caused by uneven distribution of loads and radial pressures between the various elements of the cable assembly.

It is therefore one object of this invention to provide for a flexible push-and-pull transmitting cable which is free of the disadvantages of the conventional arrangements of this kind.

It is another object of this invention to provide for a flexible cable arrangement as mentioned above which is comparatively simple to manufacture and entirely satisfactory in operation.

With above objects in view the invention includes a flexible push-and-pull transmitting cable, comprising, in combination, a flexible load transmitting elongated core member of predetermined cross-sectional profile; ball-bearing type guide sleeve means continuously surrounding said core member and comprising a plurality of metal balls spaced from each other both circumferentially and longitudinally of said sleeve means and each being in point contact with the outside of said core member, and a guide sleeve of synthetic resin material having said metal balls rotatably embedded at least partly therein and having a low coefficient of friction relative to the latter; a plurality of metal wires extending along said guide sleeve and being distributed parallel with each other around the center line of said core member, each of said wires having point contacts with a plurality of said metal balls, respectively, at points more remote from said center line than the centers of said metal balls so as to support the latter from the outside; and sheath means of synthetic resin material surrounding said guide sleeve means and said plurality of metal wires and being joined to the outside of said sleeve for constituting therewith a composite tubular unit.

It will be seen from the following description of preferred embodiments of the invention that the construction of the flexible cable arrangement of continuously extending and thus longitudinally not subdivided inner components greatly simplify the production of the entire assembly without the necessity of using additional or supplementary parts for holding elements together or in place. Also it will be seen that in this construction the load stresses that may occur are uniformly distributed so that no stress concentrations or binding or friction between movable parts can ever appear. In addition accumulation of foreign matter like dirt between movable parts is safely avoided.

The novel construction according to the invention also prevents individual balls which are in contact with the inner movable core member from being dressed or forced by accidental load stresses radially outward into the surrounding protective sheath. In addition the flexibility of the entire flexible cable assembly is greatly increased as compared with conventional arrangements. From all these advantageous features a great reliability of operation is guaranteed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

Figure 1:
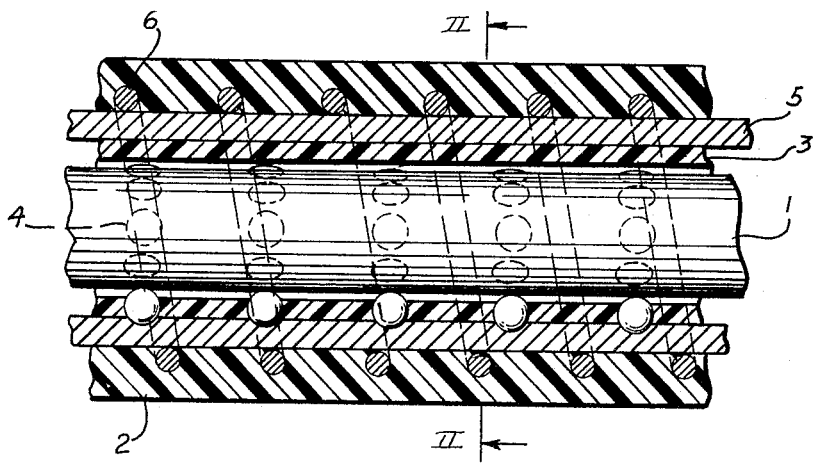
FIG. 1 is a sectional elevation illustrating one embodiment of the invention in which the internal core member has a circular cross section, the section of FIG. 1 being taken along line I—I of FIG. 2.
Figure 2:
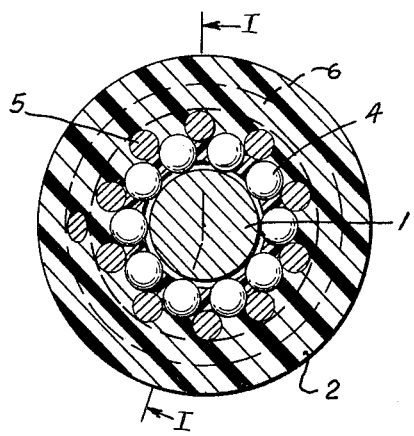
FIG. 2 is a cross-sectional end view of the arrangement according to FIG. 1, the section being taken along line II—II of FIG. 1.
Figure 3:
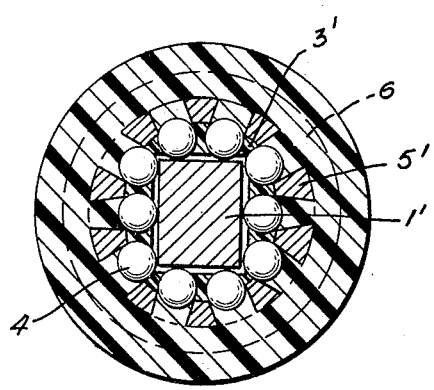
Figure 2A:
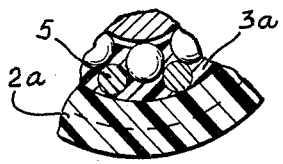

FIG. 2a is a sectional end view similar to FIG. 2 showing a modification of the arrangement according to FIGS. 1 and 2; and FIG. 3 is a cross-sectional end view similar to FIGS. 2 and 2a illustrating still another modification of the arrangement according to FIGS. 1 and 2.

Under the assumption that the illustrations show an arrangement according to the invention at greatly enlarged scale the longitudinally movable inner core member 1 may be a steel wire of circular cross section and having the desired flexibility. This core member 1 is surrounded by a tubular, elastic and flexible guide sleeve and sheath assembly which has a substantially annular cross section. This assembly is composed mainly of two substantially concentric layers of synthetic resin materials, namely of outer layer 2 constituting the outer sheath of the assembly with a normally smooth outer surface and having predetermined characteristics of strength and elasticity, while the inner layer 3 constitutes a guide sleeve serving at the same time as a ball cage means for the steel balls 4 and should therefore have, in addition to predetermined characteristics of strength and elasticity, a very low coefficient of friction relative to the adjacent elements of the assembly.

For these reasons it hase been found that a particularly well suited synthetic resin material for the outer layer or sheath 3 is a polyamide, particularly one known by the name "nylon 66" or identified by the standard designation polyamide 6.6. On the other hand well suitable materials for the inner layer or guide sleeve 2 are synthetic resins belonging into the group of polyolifines or low pressure polyamides. Among the polyolifines there is preferred the material known as polyethylene which is stable at temperatures between —40° and 100° C. Its shore hardness is 65 and it does not age nor does it react to acids. Alternatively another synthetic resin of this group may be used, namely polypropylene which is stable up to 160° C.

As can be seen from FIGS. 1 and 2, the steel balls 4 are partly embedded in the sleeve layer 3 and partly project into the outer sheath layer 2. Consequently, the balls 4 are held in proper position so as to have point contact with the outside of the core member 1, yet having practically frictionless rotatability relative to the core member 1 and to the layers 2 and 3. The steel balls 4 may be arranged as shown in FIGS. 1 and 2 in groups, each group comprising a plurality of balls circumferentially spaced from each other around the core member 1, and the individual groups being spaced from each other at regular intervals in the longitudinal direction of the assembly. However, it should be understood that in this construction the balls may also be irregularly distributed provided that they as a whole provide for point contacts with the inner core member 1 and sufficiently support the latter for free longitudinal movement within the assembly. The ball bearing type guide sleeve means described above further comprise a plurality of wires 5 which extend longitudinally and substantially parallel with the center line of the core member 1 and which have point contacts with the plurality of balls 4 at points thereof which are farther remote from the center line of the member 1 than the centers of the balls themselves. Consequently these longitudinal metal wires which have in FIGS. 1 and 2 a circular cross section, constitute an outer support of the balls in order to prevent them from being displaced radially outwardly from the center line of the assembly. According to FIGS. 1 and 2 the wires 5 are partly embedded in the inner layer 3 and partly in the outer layer 2; they remain longitudinally movable relative to the layers 2 and 3 whereby the flexibility of the entire arrangement is greatly increased.

In certain cases for instance where comparatively large forces are to be transmitted, it would be advisable to surround the entire set of wires 5 by means which are adapted to hold these wires in position in case forces directed radially outwardly should develop. In the illustrated example this additional support for the wires 5 consists of a helical wire 6 wound about the set of wires 5 and embedded in the outer sheath layer 2. Of course, if desired the helical winding 6 could be replaced with equal effect by a plurality of spaced circular ring members which surround the set of wires 5 and which are spaced from each other at substantially regular intervals.

FIG. 2a illustrates a modification of the above-described embodiment which differs from the latter only by the fact that in this case the inner layer 3a is thicker in radial direction so that it extends to approximately the outside of the wires 5 so that the latter are completely embedded in the layer 3a while the outer sheath layer 2a reaches only as far as to the outer side of the wires 5.

While in the above described embodiments the inner core member has been shown and described as being one solid steel wire of circular cross section it should be understood that the core member could as well be a cable or rope composed of a plurality of twisted strands of thinner wires. This is particularly recommendable where the cross section of the inner core member has to be comparatively large and it is still desired to give it a sufficient flexibility.

Also it is not necessary that the inner core member is provided with a circular cross section. FIG. 3 illustrates a further modification in which case the inner core member 1' has a rectangular cross section. Otherwise the arrangement is the same as described above except that it is in this case recommendable to use instead of the round wires 5 of FIGS. 1 and 2 a form of wires 5' which have for instance a trapezoidal cross section substantially as illustrated in FIG. 3. Of course, in the case of FIG. 3 the inner layer 3' will not have a circular or annular cross section as in FIG. 2 but will have a cross section which is more or less rectangular in shape in order to conform to the cross-sectional shape of the core member 1'. The question may arise as to how an assembly of the type described above and illustrated will be produced in practice. By means of special machinery which does not constitute part of this invention the entire assembly can be produced continuously in unlimited lengths by extruding simultaneously both the inner layer 3 and the outer layer 2 of the tubular assembly while at the same time automatically the inner core member, the wires 5 and if desired the reinforcing helical wire 6 are introduced into the materials being extruded, and while also the various steel balls 4 are introduced singly or in groups or in proper intervals into the developing extrusion. Of course, instead of introducing the inner core member 1 into the extruded material while the latter is extruded, the extrusion could also be carried out in a well known manner with an extrusion orifice whereby in the finished extrusion the space is provided into which the core member 1 may be inserted longitudinally later on. Experiments have shown that in this manner the ball cage nature of the inner layer 3 is automatically established because the layer 3 and the layer 2 can be so to say molded around the individual balls without the need for special core or mold members to form recesses or receptacles for the individual balls. It is particularly advisable to cover the steel balls 4 before the introduction into the synthetic materials being extruded, with graphite or a graphite containing compound or with a material which contains molybdenum sulphate. Hereby the synthetic material is positively prevented from adhering to the surface of the balls and the latter are sure to remain freely rotatable between the adjoining surfaces of the layers 2 and 3 and between the relatively small areas of the inner core 1 and the wires 5.

It will be understood that the above described arrangement according to the invention in either of its embodiments can be used for various purposes as a load transmitting cable assembly without the necessity of any lubrication or maintenance because the inner core member is entirely supported by the ball bearing arrangement and is consequently movable in either on or the other direction longitudinally without any friction for the simple reason that the balls embedded as described above are freely rotatable in any direction.

For the same reason and in view of the construction described above any inaccuracy in the loaded transmission is avoided. The arrangement operates without any lost motion or play so that any movement of the inner core member is carried out with extreme precision.

It will be further understood that the arrangement is practically not subjected to any wear and tear because the only moving parts which move relatively to each other are only in point contact with each other so that in most cases of operation the balls will roll along the adjacent parts in the manner well known from ball bearings.

When the flexible cable assembly is bent those portions of the tubular sleeve and sheath unit which are located on the outer side of the respective curvature are of course stretched somewhat relative to those portions of the tubular assembly which is located on the inner side of the curvature. In such cases, for the reasons stated above, the embedded wires 5 or 5' are free to shift as much as required relative to the layers 2 and 3 so that hereby the flexibility of the entire arrangement is in no way reduced by the insertion of the wires. Similar conditions apply to the reinforcement helix 6 or individual reinforcement or supporting rings mentioned above. Also these relative movements of the various wires take place without causing any friction or resistance. The arrangement according to the invention can be produced in various sizes and types in order to satisfy prevailing conditions. Flexible load transmitting cables of this type may be used with great advantage both in industry and mechanical devices of all kinds as well as in medical and dental apparatus. In all these cases the arrangement according to the invention will display an unusually long service life and entire reliability in operation.

It will be understood that each of the elements described above, or two or more together, may also find a useful application in other types of a flexible push-and-pull transmitting cable assembly differing from the types described above.

While the invention has been illustrated and described as embodied in a flexible push-and-pull transmitting cable assembly including a ball bearing type guide sleeve arrangement and an outer sheath surrounding the guide sleeve arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A flexible push-and-pull-transmitting cable, comprising, in combination, a flexible load transmitting elongated core member of predetermined cross-sectional profile; ball-bearing type guide sleeve means continuously surrounding said core member and comprising a plurality of metal balls spaced from each other both circumferentially and longitudinally of said sleeve means and each being in point contact with the outside of said core member, and a guide sleeve of synthetic resin material having said metal balls rotatably embedded at least partly therein and having a low coefficient of friction relative to the latter; a plurality of metal wires extending along said guide sleeve and being distributed parallel with each other around the center line of said core member, each of said wires having point contacts with a plurality of said metal balls, respectively, at points more remote from said center line than the centers of said metal balls so as to support the latter from the outside; and sheath means of synthetic resin material surrounding said guide sleeve means and said plurality of metal wires and being joined to the outside of said sleeve for constituting therewith a composite tubular unit.

2. A flexible push-and-pull-transmitting cable, comprising, in combination, a flexible load transmitting elongated core member of predetermined cross-sectional profile; ball-bearing type guide sleeve means continuously surrounding said core member and comprising a plurality of metal balls spaced from each other both circumferentially and longitudinally of said sleeve means and each being in point contact with the outside of said core member, and a guide sleeve of synthetic resin material being a member of the group consisting of polyolefines and low-pressure polyamides having said metal balls rotatably embedded at least partly therein and having a low coefficient of friction relative to the latter; a plurality of metal wires extending along said guide sleeve and being distributed parallel with each other around the center line of said core member, each of said wires having point contacts with a plurality of said metal balls, respectively, at points more remote from said center line than the centers of said metal balls so as to support the latter from the outside; and sheath means of synthetic resin material being a member of the group consisting of polyamides surrounding said guide sleeve means and said plurality of metal wires and being joined to the outside of said sleeve for constituting therewith a composite tubular unit.

3. A flexible push-and-pull-transmitting cable, comprising, in combination, a flexible load transmitting elongated core member of predetermined cross-sectional profile; ball-bearing type guide sleeve means continuously surrounding said core member and comprising a plurality of metal balls spaced from each other both circumferentially and longitudinally of said sleeve means and each being in point contact with the outside of said core member, and a guide sleeve of synthetic resin material consisting of polyethylene having said metal balls rotatably embedded at least partly therein and having a low coefficient of friction relative to the latter; a plurality of metal wires extending along said guide sleeve and being distributed parallel with each other around the center line of said core member, each of said wires having point contacts with a plurality of said metal balls, respectively, at points more remote from said center line than the centers of said metal balls so as to support the later from the outside; and sheath means of synthetic resin material consisting of polyamide 6.6 surrounding said guide sleeve means and said plurality of metal wires and being joined to the outside of said sleeve for constituting therewith a composite tubular unit.

4. A flexible push-and-pull-transmitting cable, comprising, in combination, a flexible load transmitting elongated core member of predetermined cross-sectional profile; ball-bearing type guide sleeve means continuously surrounding said core member and comprising a plurality of metal balls spaced from each other both circumferentially and longitudinally of said sleeve means and each being in point contact with the outside of said core member, and a guide sleeve of synthetic resin material being a member of the group consisting of polyolefins and low-pressure polyamides having said metal balls rotatably embedded at least partly therein and having a low coefficient of friction relative to the latter; a plurality of metal wires of circular cross-section extending along said guide sleeve and being distributed parallel with each other around the center line of said core member, each of said wires having point contacts with a plurality of said metal balls, respectively, at points more remote from said center line than the centers of said metal balls so as to support the latter from the outside; and sheath means of synthetic resin material being a member of the group consisting of polyamides surrounding said guide sleeve means and said plurality of metal wires and being joined to the outside of said sleeve for constituting therewith a composite tubular unit.

5. A flexible push-and-pull-transmitting cable, comprising, in combination, a flexible load transmitting elongated core member of predetermined cross-sectional profile; ball-bearing type guide sleeve means continuously surrounding said core member and comprising a plurality of metal balls spaced from each other both circumferentially and longitudinally of said sleeve means and each being in point contact with the outside of said core member, and a guide sleeve of synthetic resin material consisting of polyethylene having said metal balls rotatably embedded at least partly therein and having a low coefficient of friction relative to the latter; a plurality of metal wires of circular cross-section extending along said guide sleeve and being distributed parallel with each other around the center line of said core member, each of said wires having point contacts with a plurality of said metal balls, respectively, at points more remote from said center line than the centers of said metal balls so as to support the latter from the outside; and sheath means of synthetic resin material consisting of polyamide 6.6 surrounding said guide sleeve means and said plurality of metal wires and being joined to the outside of said sleeve for constituting therewith a composite tubular unit.

6. A flexible push-and pull-transmitting cable, comprising, in combination, a flexible load transmitting elonlongated core member of predetermined cross-sectional profile; ball-bearing type guide sleeve means continuously surrounding said core member and comprising a plurality of metal balls spaced from each other both circumferentially and longitudinally of said sleeve means and each being in point contact with the outside of said core member, and a guide sleeve of synthetic resin material being a member of the group consisting of polyolefines and low-pressure polyamides having said metal balls rotatably embedded at least partly therein and having a low coefficient of friction relative to the latter; a plurality of metal wires of substantially trapezoidal cross-section extending along said guide sleeve and being distributed parallel with each other around the center line of said core member, each of said wires having point contacts with a plurality of said metal balls, respectively, at points more remote from said center line than the centers of said metal balls so as to support the latter from the outside; and sheath means of synthetic resin material being a member of the group consisting of polyamides surrounding said guide sleeve means and said plurality of metal wires and being joined to the outside of said sleeve for constituting therewith a composite tubular unit.

7. A flexible push-and-pull transmitting cable, comprising, in combination, a flexible load transmitting elongated core member of predetermined cross-sectional profile; ball-bearing type guide sleeve means continuously surrounding said core member and comprising a plurality of metal balls spaced from each other both circumferentially and longitudinally of said sleeve means and each being in point contact with the outside of said core member, and a guide sleeve of synthetic resin material consisting of polyethylene having said metal balls rotatably embedded at least partly therein and having a low coefficient of friction relative to the latter; a plurality of metal wires of substantially trapezoidal cross-section extending along said guide sleeve and being distributed parallel with each other around the center line of said core member, each of said wires having point contacts with a plurality of said metal balls, respectively, at points more remote from said center line than the centers of said metal balls so as to support the latter from the outside; and sheath means of synthetic resin material consisting of polyamide 6.6 surrounding said guide sleeve means and said plurality of metal wires and being joined to the outside of said sleeve for constituting therewith a composite tubular unit.

8. A flexible push-and-pull transmitting cable, comprising, in combination, a flexible load transmitting elongated core member of predetermined cross-sectional profile; ball-bearing type guide sleeve means continuously surrounding said core member and comprising a plurality of metal balls spaced from each other both circumferentially and longitudinally of said sleeve means and each being in point contact with the outside of said core member, and a guide sleeve of synthetic resin material having said metal balls rotatably embedded at least partly therein and having a low coefficient of friction relative to the latter; a plurality of metal wires extending along said guide sleeve and being distributed parallel with each other around the center line of said core member, each of said wires having point contacts with a plurality of said metal balls, respectively, at points more remote from said center line than the centers of said metal balls so as to support the latter from the outside; and sheath means of synthetic resin material surrounding said guide sleeve means and said plurality of metal wires and being joined to the outside of said sleeve for constituting therewith a composite tubular unit, said sheath means including embedded therein metallic support means surrounding said plurality of metal wires for supporting the latter against displacement in radially outward direction.

9. A flexible push-and-pull-transmitting cable, comprising, in combination, a flexible load transmitting elongated core member of predetermined cross-sectional profile; ball-bearing type guide sleeve means continuously surrounding said core member and comprising a plurality of metal balls spaced from each other both circumferentially and longitudinally of said sleeve means and each being in point contact with the outside of said core member, and a guide sleeve of synthetic resin material having said metal balls rotatably embedded at least partly therein and having a low coefficient of friction relative to the latter; a plurality of metal wires extending along said guide sleeve and being distributed parallel with each other around the center line of said core member, each of said wires having point contacts with a plurality of said metal balls, respectively, at points more remote from said center line than the centers of said metal balls so as to support the latter from the outside; and sheath means of synthetic resin material surrounding said guide sleeve means and said plurality of metal wires and being joined to the outside of said sleeve for constituting therewith a composite tubular unit, said sheath means including embedded therein metallic support wire means helically surrounding said plurality of metal wires for supporting the latter against displacement in radially outward direction.

10. A flexible push-and-pull transmitting cable, comprising, in combination, a flexible load transmitting elongated core member of predetermined cross-sectional profile; ball-bearing type guide sleeve means continuously surrounding said core member and comprising a plurality of metal balls spaced from each other both circumferentially and longitudinally of said sleeve means and each being in point contact with the outside of said core member, and a guide sleeve of synthetic resin material being a member of the group consisting of polyolefines and low-pressure polyamides having said metal balls rotatably embedded at least partly therein and having a low coefficient of friction relative to the latter; a plurality of metal wires extending along said guide sleeve and being distributed parallel with each other around the center line of said core member, each of said wires having point contacts with a plurality of said metal balls, respectively, at points more remote from said center line than the centers of said metal balls so as to support the latter from the outside; and sheath means of synthetic resin material being a member of the group consisting of polyamides surrounding said guide sleeve means and said plurality of metal wires and being joined to the outside of said sleeve for constituting therewith a composite tubular unit, said sheath means including embedded therein metallic support means surrounding said plurality of metal wires for supporting the latter against displacement in radially outward direction.

11. A flexible push-and-pull-transmitting cable, comprising, in combination, a flexible load transmitting elongated core member of predetermined cross-sectional profile; ball-bearing type guide sleeve means continuously surrounding said core member and comprising a plurality of metal balls spaced from each other both circumferentially and longitudinally of said sleeve means and each being in point contact with the outside of said core member, and a guide sleeve of synthetic resin material being a member of the group consisting fo polyolefines and low-pressure polyamides having said metal balls rotatably imbedded at least partly therein and having a low coefficient of friction relative to the latter; a plurality of metal wires extending along said guide sleeve and being distributed parallel with each other around the center line of said core member, each of said wires having point contacts with a plurality of said metal balls, respectively, at points more remote from said center line than the centers of said metal balls so as to support the latter from the outside; and sheath means of synthetic resin material being a member of the group consisting of polyamides surrounding said guide sleeve means and said plurality of metal wires and being joined to the outside of said sleeve for constituting therewith a composite tubular unit, said sheath means including embedded therein metallic support wire means helically surrounding said plurality of metal wires for supporting the latter against displacement in radially outward direction.

12. A flexible push-and-pull-transmitting cable, comprising, in combination, a flexible load transmitting elongated core member of predetermined cross-sectional profile; ball-bearing type guide sleeve means continuously surrounding said core member and comprising a plurality of metal balls spaced from each other both circumferentially and longitudinally of said sleeve means and each being in point contact with the outside of said core member, and a guide sleeve of synthetic resin material consisting of polyethylene having said metal balls rotatably embedded at least partly therein and having a low coefficient of friction relative to the latter; a plurality of metal wires extending along said guide sleeve and being distributed parallel with each other around the center line of said core member, each of said wires having point contacts with a plurality of said metal balls, respectively, at points more remote from said center line than the centers of said metal balls so as to support the latter from the outside; and sheath means of synthetic resin material consisting of polyamide 6.6 surrounding said guide sleeve means and said plurality of metal wires and being joined to the outside of said sleeve for constituting therewith a composite tubular unit, said sheath means including embedded therein metallic support means surrounding said plurality of metal wires for supporting the latter against displacement in radially outward direction.

13. A flexible push-and-pull transmitting cable, comprising, in combination, a flexible load transmitting elongated core member of predetermined cross-sectional profile; ball-bearing type guide sleeve means continuously surrounding said core member and comprising a plurality of metal balls spaced from each other both circumferentially and longitudinally of said sleeve means and each being in point contact with the outside of said core member, and a guide sleeve of synthetic resin material consisting of polyethylene having said metal balls rotatably embedded at least partly therein and having a low coefficient of friction relative to the latter; a plurality of metal wires extending along said guide sleeve and being distributed parallel with each other around the center line of said core member, each of said wires having point contacts with a plurality of said metal balls, respectively, at points more remote from said center line than the centers of said metal balls so as to support the latter from the outside; and sheath means of synthetic resin material consisting of polyamide 6.6 surrounding said guide sleeve means and said plurality of metal wires and being joined to the outside of said sleeve for constituting therewith a composite tubular unit, said sheath means including embedded therein metallic support wire means helically surrounding said plurality of metal wires for supporting the latter against displacement in radially outward direction.

14. A flexible push-and-pull-transmitting cable, comprising, in combination, a flexible load transmitting elongated core member of predetermined cross-sectional profile; ball-bearing type guide sleeve means continuously surrounding said core member and comprising a plurality of metal balls spaced from each other both circumferentially and longitudinally of said sleeve means and each being in point contact with the outside of said core member, and a guide sleeve of synthetic resin material having said metal balls rotatably embedded at least partly therein and having a low coefficient of friction relative to the latter; a plurality of metal wires of circular cross-section extending along said guide sleeve and being distributed parallel with each other around the center line of said core member, each of said wires having point contacts with a plurality of said metal balls, respectively, at points more remote from said center line than the centers of said metal balls so as to support the latter from the outside; and sheath means of synthetic resin material surrounding said guide sleeve means and said plurality of metal wires and being joined to the outside of said sleeve for constituting therewith a composite tubular unit, said sheath means including embedded therein metallic support means surrounding said plurality of metal wires for supporting the latter against displacement in radially outward direction.

15. A flexible push-and-pull-transmitting cable, comprising, in combination, a flexible load transmitting elongated core member of predetermined cross-sectional profile; ball-bearing type guide sleeve means continuously surrounding said core member and comprising a plurality of metal balls spaced from each other both circumferentially and longitudinally of said sleeve means and each being in point contact with the outside of said core member, and a guide sleeve of synthetic resin material having said metal balls rotatably embedded at least partly therein and having a low coefficient of friction relative to the latter; a plurality of metal wires of circular cross-section extending along said guide sleeve and being distributed parallel with each other around the center line of said core member, each of said wires having point contacts with a plurality of said metal balls, respectively, at points more remote from said center line than the centers of said metal balls so as to support the latter from the outside; and sheath means of synthetic resin material surrounding said guide sleeve means and said plurality of metal wires and being joined to the outside of said sleeve for constituting therewith a composite tubular unit, said sheath means including embedded therein metal support wire means helically surrounding said plurality of metal wires for supporting the latter against displacement in radially outward direction.

References Cited by the Examiner
UNITED STATES PATENTS

| | | | |
|---|---|---|---|
| 2,814,029 | 7/1958 | Richoux | 74—501 |
| 3,135,132 | 6/1964 | Bratz | 64—3 |

FRED C. MATTERN, JR., *Primary Examiner.*

J. D. PUFFER, *Assistant Examiner.*